US010259366B2

(12) United States Patent
Imai et al.

(10) Patent No.: US 10,259,366 B2
(45) Date of Patent: Apr. 16, 2019

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Miki Imai, Aichi-ken (JP); Kazushi Nishiyama, Aichi-ken (JP); Yuji Nishiyama, Aichi-ken (JP); Junichi Munechika, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/883,149

(22) Filed: Jan. 30, 2018

(65) Prior Publication Data

US 2018/0215297 A1    Aug. 2, 2018

(30) Foreign Application Priority Data

Feb. 2, 2017    (JP) ................................ 2017-017530

(51) Int. Cl.
*A47C 7/02*    (2006.01)
*B60N 2/70*    (2006.01)
*B60N 2/68*    (2006.01)

(52) U.S. Cl.
CPC .............. *B60N 2/7011* (2013.01); *B60N 2/68* (2013.01)

(58) Field of Classification Search
CPC .. D03D 15/0077; D03D 13/006; D03D 15/08; D03D 13/008; A47C 7/30; A47C 7/02; B60N 2/7011; B60N 2/68
(Continued)

(56) References Cited

U.S. PATENT DOCUMENTS 6,035,901 A * 3/2000 Stumpf .................... A47C 1/03
139/419
6,854,805 B2 * 2/2005 Fujita ................... B60N 2/7094
297/452.56
(Continued)

FOREIGN PATENT DOCUMENTS

EP    1547488    6/2005
JP    2003-342859    12/2003
(Continued)

OTHER PUBLICATIONS

Extended European Search Report for EP 18154056.8 dated Jun. 22, 2018.

*Primary Examiner* — Syed A Islam
(74) *Attorney, Agent, or Firm* — Greenblum & Bernstein, P.L.C.

(57) ABSTRACT

A vehicle seat includes: a seat frame; a seat pad; and a planar body configured to support, from a backside, the seat pad, and including a high-elongation part more easily extensible than other planar-body part. The planar body includes a low-density region, a high-density region, and a medium-density region in which constituent yarns are placed more thickly than the low-density region, but more thinly than the high-density region, the medium-density region being provided between the low-density region and the high-density region adjacent to each other. The low-density region is placed in the high-elongation part so that the high-elongation part is easily extensible. The high-density region and the medium-density region are placed in the other planar-body part so that the other planar-body part is less easily extensible. The medium-density region in the other planar-body part is adjacent to the high-elongation part.

6 Claims, 6 Drawing Sheets

(58) Field of Classification Search
USPC ............. 297/452.18, 452.13, 452.56, 452.64
See application file for complete search history.

(56) References Cited

U.S. PATENT DOCUMENTS

| | | | | |
|---|---|---|---|---|
| 8,991,931 B2* | 3/2015 | Narita | ...................... | A47C 7/30 |
| | | | | 297/452.1 |
| 2004/0124689 A1* | 7/2004 | Numa | .................... | A47C 7/282 |
| | | | | 297/452.56 |
| 2007/0170759 A1* | 7/2007 | Nolan | .................. | B60N 2/2851 |
| | | | | 297/250.1 |

FOREIGN PATENT DOCUMENTS

| | | |
|---|---|---|
| JP | 2005-46355 | 2/2005 |
| JP | 2011-255762 | 12/2011 |
| JP | 2015-229357 | 12/2015 |
| WO | 99/58022 | 11/1999 |

\* cited by examiner

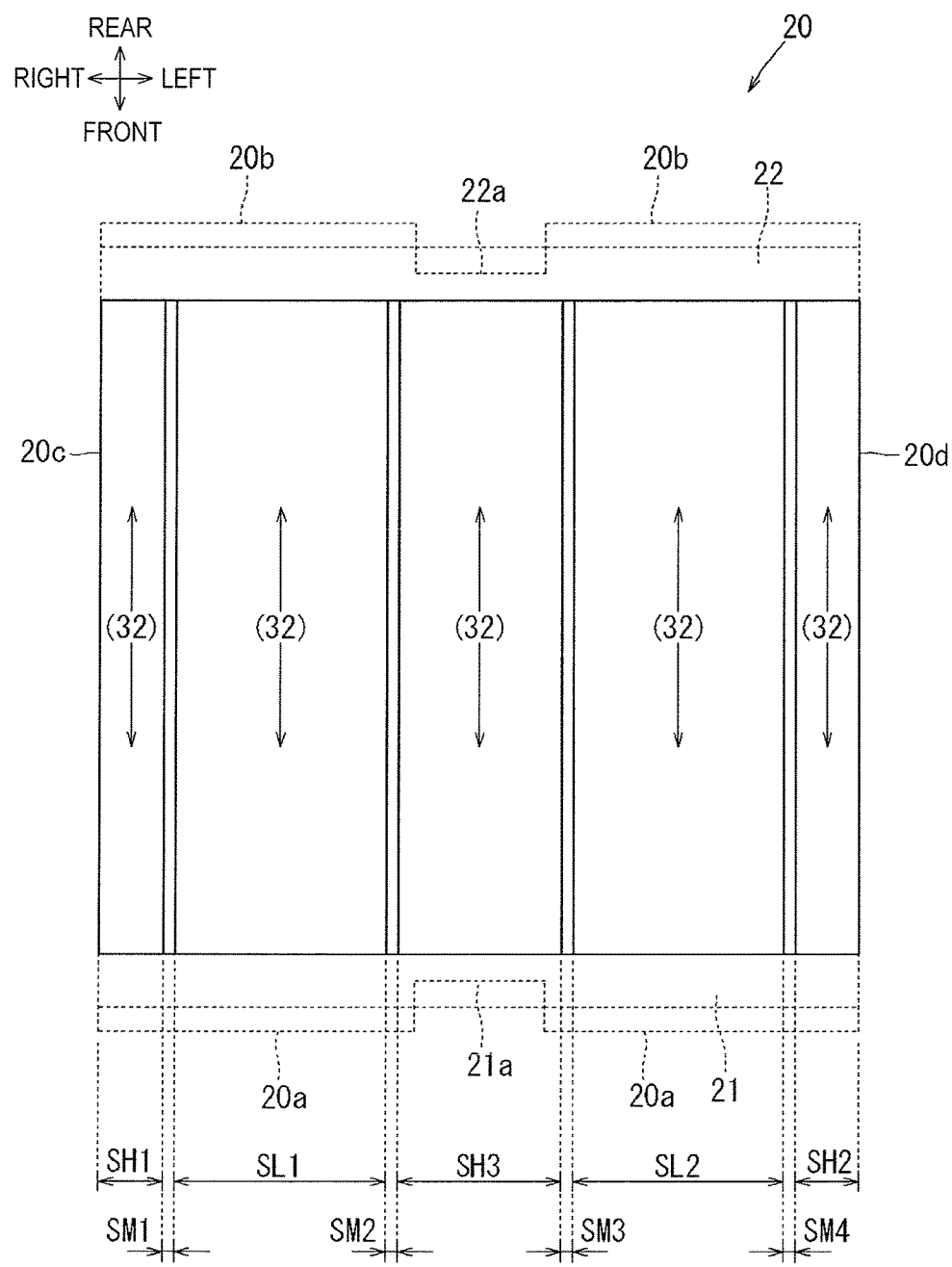

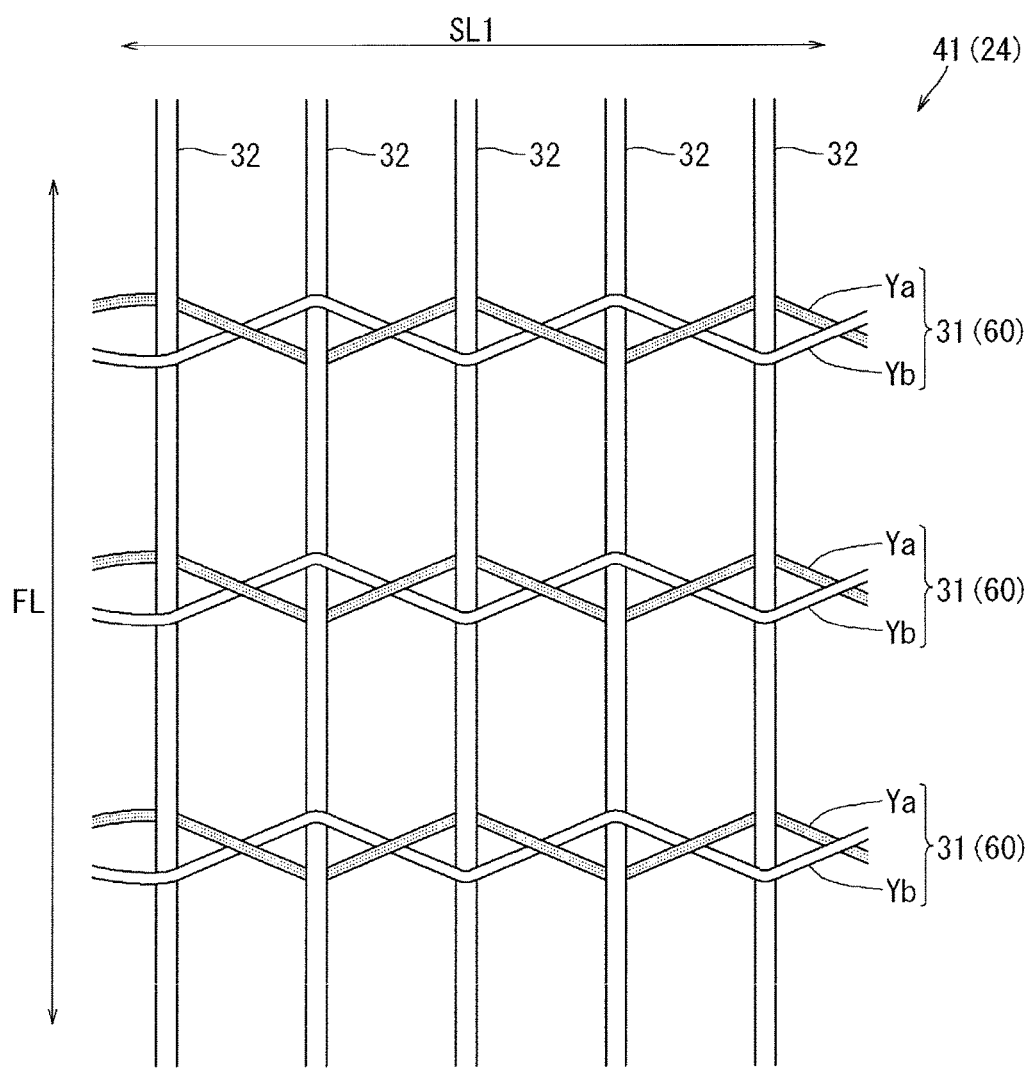

VEHICLE SEAT

INCORPORATION BY REFERENCE

The disclosure of Japanese Patent Application No. 2017-017530 filed on Feb. 2, 2017 including the specification, drawings and abstract is incorporated herein by reference in its entirety.

BACKGROUND

1. Technical Field

The present disclosure relates to a vehicle seat including a frame-shaped seat frame, a seat pad for elastically supporting a passenger, and a planar body for supporting the seat pad from a backside, the seat pad being placed inside the seat frame.

2. Description of Related Art

In this type of vehicle seat, a planar body is provided in a stretched manner inside a seat frame forming a seat framework, and the planar body supports a seat pad for elastically supporting an occupant. The planar body is a face material having a moderate flexibility, and supports the seat pad from a backside while extending due to its own flexibility. In this type of configuration, the seat pad is pressed by an occupant in a sitting state so that the seat pad sinks downward. At this time, for example, a seat-pad portion that supports occupant buttocks (particularly, occupant hip-bones) tends to largely sink by being strongly pressed. On this account, from the viewpoint of improvement of a sitting property of the seat, it is desired that an elongation rate of the planar body be changed partially so that the planar body partially largely extends to support the seat-pad portion thus strongly pressed. That is, it is desired that the planar body be partially made easily extensible, so that a sitting pressure concentrating on the seat-pad portion for supporting the occupant buttocks is dispersed, so as to achieve a more ideal distribution of the sitting pressure.

For example, in a technique described in Japanese Patent Application Publication No. 2005-46355 (JP 2005-46355 A), a seat planar support member for supporting a seat pad is attached within a seat frame. The seat planar support member includes a flexible net material as an example of a planar body of the present disclosure, and a lamination fabric material. The flexible net material is a face material having a moderate flexibility and a generally rectangular shape in a front view, and is constituted by a fabric material or a three-dimensional knit fabric including elastic yarns. Further, the lamination fabric material is a generally rectangular face material having a smaller size than the flexible net material, and its elongation percentage in a surface direction is smaller than that of the flexible net material. In the technique as known in the art, the flexible net material is provided in a stretched manner inside the seat frame and the lamination fabric material is fixed at an appropriate position of the flexible net material. This can provide a difference in elongation rate of the flexible net material between a part where the lamination fabric material is placed and a part where the lamination fabric material is not placed. In view of this, it is conceivable to improve a distribution property of a sitting pressure of a seat by applying the technique as known in the art to fix the lamination fabric material to the appropriate position of the planar body so as to partially change the elongation rate.

SUMMARY

However, when the configuration as known in the art is applied, a member such as the lamination fabric material is required in addition to the planar body, and an increase in the number of components of the seat cannot be avoided. Further, a marked difference occurs in the elongation rate of the planar body between a part where the lamination fabric material is placed and a part where the lamination fabric material is not placed, which might decrease the sitting property so that the occupant feels uncomfortable. The present disclosure provides a vehicle seat that can partially change an elongation rate of a planar body with a good performance so as to improve distribution performance of a sitting pressure of the seat.

A vehicle seat according to an aspect of the present disclosure includes: a seat frame; a seat pad; and a planar body configured to support, from a backside, the seat pad placed inside the seat frame, the planar body being provided with a high-elongation part more easily extensible than other planar-body part. In this type of configuration, in order to improve distribution performance of a sitting pressure of the seat, it is desired that an elongation rate of the planar body be partially changed with a good performance (e.g., with a good sitting property).

The planar body is a fabric in which a plurality of constituent yarns is entangled, and includes a low-density region in which the constituent yarns extending in the same direction are placed thinly, a high-density region in which the constituent yarns extending in the same direction are placed more thickly than the low-density region, and a medium-density region in which the constituent yarns extending in the same direction are placed more thickly than the low-density region, but more thinly than the high-density region, the medium-density region being provided between the low-density region and the high-density region adjacent to each other. The low-density region is placed in the high-elongation part so that the high-elongation part is easily extensible. The high-density region and the medium-density region are placed in the other planar-body part so that the other planar-body part is less easily extensible. The medium-density region in the other planar-body part is adjacent to the high-elongation part. In the aspect, by changing an arrangement relationship of the constituent yarns, the low-density region relatively easily extensible is formed in the planar body. The low-density region allows the high-elongation part to be easily extensible without members such as a lamination fabric material. Further, when the medium-density region in the other planar-body part is placed adjacent to the high-elongation part, a marked difference in elongation rate between the other planar-body part and the high-elongation part can be avoided as much as possible.

In the above aspect, the planar body may be a fabric in which a plurality of first constituent yarns extending in one direction and a plurality of second constituent yarns extending in a direction intersecting with the one direction are entangled; the planar body may include, as the low-density region and the high-density region, a primary low-density region and a primary high-density region each constituted by the plurality of first constituent yarns, and a secondary low-density region and a secondary high-density region each constituted by the plurality of second constituent yarns; the medium-density region may be provided between the primary low-density region and the primary high-density region and between the secondary low-density region and the secondary high-density region; the primary low-density region and the secondary low-density region may be placed in an overlapped manner in the high-elongation part so that the high-elongation part is easily extensible; at least one of the primary high-density region and the secondary high-density region, and the medium-density region may be placed in the other planar-body part so that the other planar-body part is less easily extensible; and the medium-density region in the other planar-body part may be adjacent to the high-elongation part. In this configuration, two types of low-density regions provided in the planar body are placed in an overlapped manner, so that the high-elongation part can be more surely easily extensible. Further, in the present disclosure, the medium-density region is provided between the primary low-density region and the primary high-density region, and another medium-density region is also provided between the secondary low-density region and the secondary high-density region. With those two types of medium-density regions, a marked difference in elongation rate between the other planar-body part and the high-elongation part can be more surely avoided.

In the above aspect, the planar body may be a fabric in which a plurality of first constituent yarns extending in one direction and a plurality of second constituent yarns extending in a direction intersecting with the one direction are entangled; and the high-elongation part may have a restriction structure configured to restrict a relative movement between the first constituent yarns and the second constituent yarns. In this configuration, even if the constituent yarns are placed thinly in the low-density region constituting the high-elongation part, an occurrence of slips (separation between the constituent yarns adjacent to each other) is prevented as much as possible by the restriction structure, so that a decrease in strength of the high-elongation part can be avoided as much as possible.

In the above aspect, the constituent yarns placed in the low-density region may have a higher strength than the constituent yarns placed in the high-density region. In this configuration, even if the constituent yarns are placed thinly in the low-density region constituting the high-elongation part, a decrease in strength of the high-elongation part can be avoided more surely by using high-strength constituent yarns.

In the above aspect, in the medium-density region, the constituent yarns extending in the same direction may be placed to be gradually thinner from the high-density region toward the low-density region. In this configuration, the constituent yarns in the medium-density region are placed appropriately so as to be changed in density gradually (changed in a gradation manner), so that a marked difference in elongation rate between the other planar-body part and the high-elongation part can be further surely avoided.

In the above aspect, the vehicle seat may include a seat cushion configured to support a lower part of a body of an occupant in a sitting state, and a seatback provided in a raised state from a rear part of the seat cushion so as to support an upper body of the occupant in the sitting state; at least one member out of the seat cushion and the seatback may include the seat frame, the seat pad, and the planar body; in a case where the one member is the seat cushion, the high-elongation part may be provided in a rear part of the planar body, the rear part being configured to support a seat-pad portion that supports hipbones of the occupant in the sitting state; and in a case where the one member is the seatback, the high-elongation part may be provided in an upper part of the planar body in the raised state, the upper part being configured to support a seat-pad portion that supports shoulder blades of the occupant in the sitting state. In this configuration, the seat pad of at least one of the seat cushion and the seatback can be supported by the planar body. At this time, in terms of the seat cushion, in consideration that the seat-pad portion for supporting the occupant buttocks largely sinks, the high-elongation part that is easily extensible is provided in the rear part of the planar body, the rear part being configured to support the seat-pad portion. Further, in terms of the seatback, in consideration that the seat-pad portion for supporting the occupant shoulder blades largely sinks, the high-elongation part that is easily extensible is provided in the upper part of the planar body, the upper part being configured to support the seat-pad portion.

In the above aspect, in order to improve distribution performance of a sitting pressure of the seat, the elongation rate of the planar body can be partially changed with a good performance. Further, the elongation rate of the planar body can be partially changed with a good sitting property more surely. Further, the elongation rate of the planar body can be partially changed with a good strength property more surely. Further, the elongation rate of the planar body can be partially changed with a further good strength property. Further, the elongation rate of the planar body can be partially changed with a further good sitting property. In either case of the seat cushion and the seatback, in order to improve the distribution performance of the sitting pressure of the seat, the elongation rate of the planar body can be partially changed with a good performance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a top view of the planar body, illustrating only second constituent yarns; and FIG. 6 is an enlarged top view of a part of a planar body according to a modification.

DETAILED DESCRIPTION OF EMBODIMENTS

Figure 1:
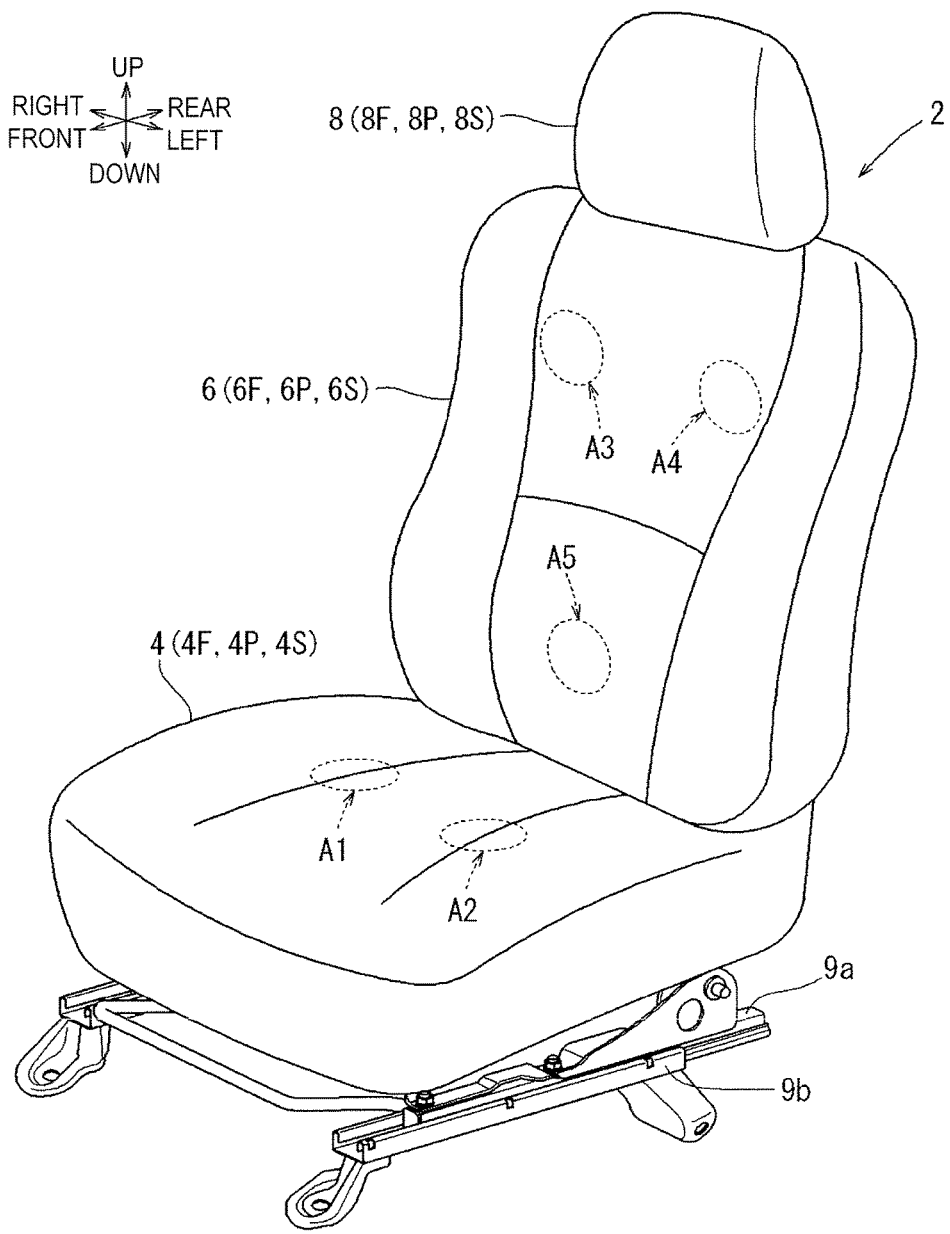
FIG. 1 is a perspective view of a vehicle seat.

The following describes an embodiment for carrying out the present disclosure with reference to FIGS. 1 to 6. In each of the figures, respective arrows indicating a front-rear direction, an up-down direction, and a right-left direction of a vehicle seat are illustrated appropriately. A vehicle seat 2 in FIG. 1 includes a seat cushion 4, a seatback 6, and a headrest 8. These seat components each include: a seat frame (4F, 6F, 8F) forming a seat framework; a seat pad (4P, 6P, 8P) for elastically supporting an occupant; and a seat cover (4S, 6S, 8S) covering the seat pad. A lower part of the seatback 6 is connected to a rear part of the seat cushion 4 (details thereof will be described later) in a rising and tilting manner, and the headrest 8 is disposed on an upper part of the seatback 6 in an upright state. Further, an upper rail 9a is attached to a lower part of the seat cushion 4. When this upper rail 9a is slidably assembled to a lower rail 9b attached to a floor surface of a passenger compartment, the seat components can be slid along the lower rail 9b.

Seat Cushion

The seat cushion 4 is a member that supports a lower part of a body of an occupant in a sitting state, and includes the above basic constituents 4F, 4P, 4S, a plurality of holding bodies 11 to 14, and a planar body 20 (details of each member will be described later) with reference to FIG. 2. The seat cushion 4 is formed such that the seat pad 4P is disposed on the frame-shaped seat frame 4F, and then covered with the seat cover 4S. At this time, a backside of the seat pad 4P is supported by the planar body 20 (described later) placed inside the seat frame 4F. At the time when the occupant sits, the planar body 20 extends moderately to support the seat pad 4P, but in this type of seat configuration, seat-pad portions A1, A2 that support occupant buttocks (particularly, occupant hipbones) tend to relatively largely sink downward. On this account, in order to improve distribution performance of a sitting pressure of the seat, the planar body 20 is provided with a pair of high-elongation parts 41, 42 (describe later) that are relatively largely extensible. The high-elongation parts 41, 42 largely extend to support the seat-pad portions A1, A2. However, in this type of configuration, a marked difference in elongation rate occurs between other planar-body parts 51 to 55 illustrated in FIG. 3 and the high-elongation parts 41, 42, which might decrease seat performance so that the occupant feels uncomfortable. In view of this, in the present embodiment, in order to improve distribution performance of a sitting pressure of the seat, the elongation rate of the planar body 20 is partially changed with a good performance with a configuration described later. The following describes the configuration more specifically.

Basic Configuration

Figure 2:
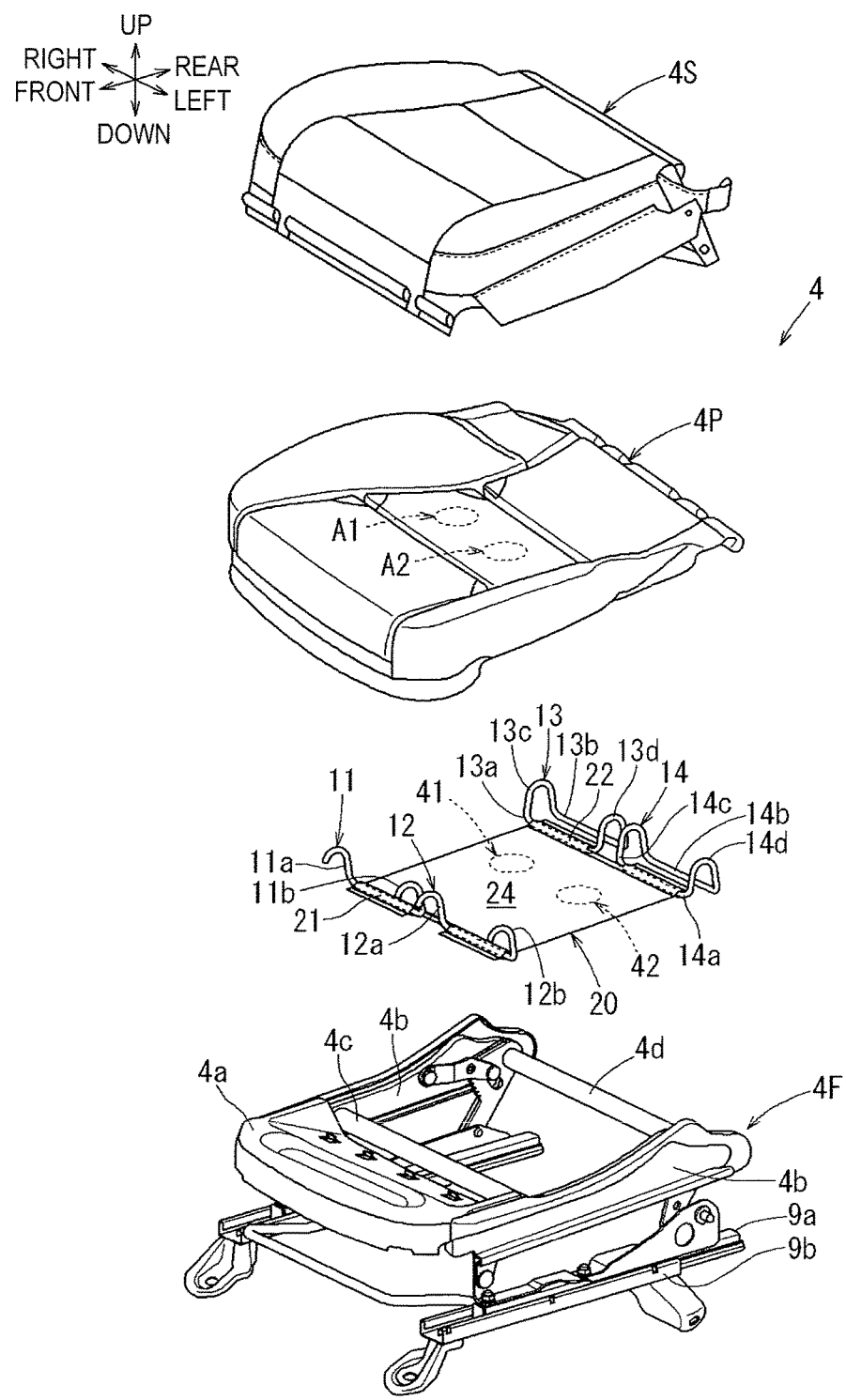
FIG. 2 is an exploded perspective view of a seat cushion.

With reference to FIG. 2, the seat cover 4S is a pouch-shaped member that can cover the seat pad 4P, and can be made of a fabric (a woven fabric, a knitted fabric, a nonwoven fabric) or leather (natural leather, synthetic leather). Further, the seat pad 4P is a member that forms a seat outer shape, and can be made of foaming resin such as polyurethane foam (a density: 10 kg/m$^3$ to 60 kg/m$^3$). The seat frame 4F is a metal frame body having a generally rectangular shape when viewed from above, and includes a front frame 4a, a pair of side frames 4b, a reinforcing frame 4c, and a rear frame 4d. The front frame 4a is a flat-shaped member constituting a seat-frame front part. Further, the pair of side frames 4b are flat-shaped members constituting seat-frame side parts, and are placed on right and left sides of the seat so as to face each other. Further, the reinforcing frame 4c is a pipe-shaped member elongated in a seat-width direction, and is provided on front sides of the pair of side frames 4b in a bridging manner. Further, the rear frame 4d is a pipe-shaped member elongated in the seat-width direction, and is provided in a bridging manner between rear parts of the pair of side frames 4b. The reinforcing frame 4c is placed near the front frame 4a and is distanced from the rear frame 4d with a given distance in the front-rear direction, so that the after-mentioned planar body 20 is disposed between the frames 4c, 4d.

Holding Bodies

Figure 3:
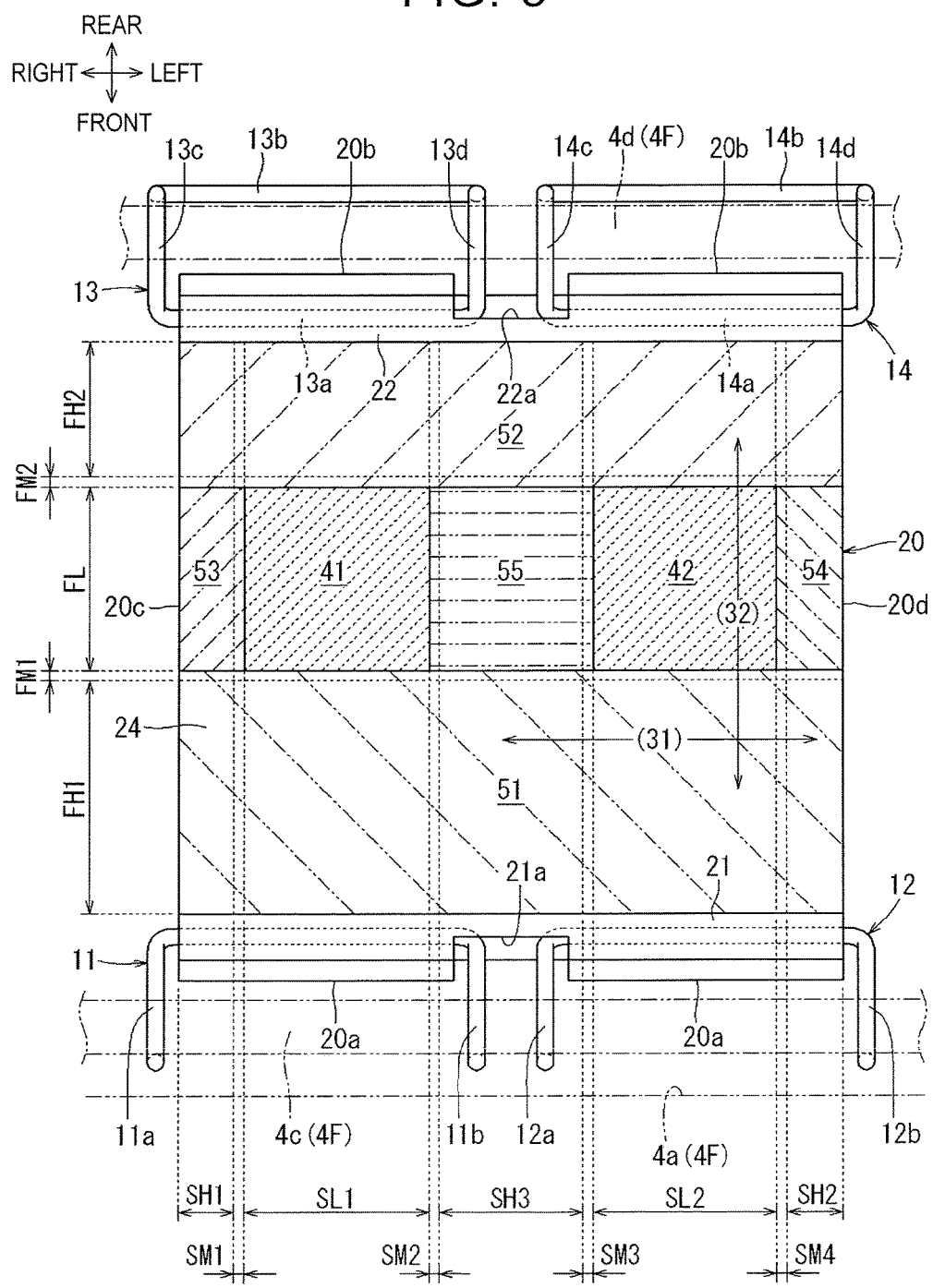
FIG. 3 is a top view of a planar body and a holding body.

With reference to FIGS. 2 and 3, the plurality of holding bodies (a first holding body 11 to a fourth holding body 14) are members that hold the after-mentioned planar body 20 and are attached to the reinforcing frame 4c and the rear frame 4d of the seat frame 4F. The first holding body 11 and the second holding body 12 have generally the same basic configuration, and are symmetrically placed in a front end of the planar body 20. For example, the first holding body 11 placed on a right side is a stick member extending in the seat-width direction, and includes a pair of right and left latching portions 11a, 11b. The right latching portion 11a is a part curving upward to form a generally reverse U-shape, and projects forward from a right end of the first holding body 11. Further, the left latching portion 11b is a part curving upward to form a generally reverse U-shape, and projects forward from a left end of the first holding body 11. In a state where the first holding body 11 is attached to the after-mentioned planar body 20, the latching portions 11a, 11b are placed at respective positions where they project forward so as to be hooked to the reinforcing frame 4c from an upper side. Also, the second holding body 12 placed on a left side is a stick member extending in the seat-width direction, and includes a pair of right and left latching portions 12a, 12b.

Further, the third holding body 13 and the fourth holding body 14 have generally the same basic configuration, and are symmetrically placed in a rear end of the planar body 20. For example, the third holding body 13 placed on the right side is a generally rectangular frame body elongated in the seat-width direction, and includes a front frame portion 13a, a rear frame portion 13b, and right and left side frame portions 13c, 13d that connect the front and rear frame portions to each other. The side frame portions 13c, 13d extend in the front-rear direction in a state curved upward to form a generally semicircular shape, so that the side frame portions 13c, 13d are connected to corresponding ends of the front frame portion 13a and corresponding ends of the rear frame portion 13b. Further, in order to be passed through a second insertion portion 22 (described later), a divided part (not shown) is provided in a part of the rear frame portion 13b. In a state where the front frame portion 13a is attached to the after-mentioned planar body 20, respective parts from respective side frame portion 13c, 13d to the rear frame portion 13b are placed at respective positions where they project rearward so as to be hooked to the rear frame 4d from the upper side. Further, the fourth holding body 14 placed on the left side is a generally rectangular frame body elongated in the seat-width direction, and includes a front frame portion 14a, a rear frame portion 14b, and right and left side frame portions 14c, 14d.

Planar Body

With reference to FIGS. 2 and 3, the planar body 20 is a face material that supports, from the backside, the seat pad 4P placed inside the seat frame 4F, and includes a pair of insertion portions 21, 22 and a body portion 24. The planar body 20 is a face material made of a seamless fabric and having a generally rectangular shape in a top view, and includes a front edge 20a, a rear edge 20b, a right edge 20c, and a left edge 20d, with reference to FIG. 3. Here, the front edge 20a is an edge forming a front end of the planar body 20 and extending in the right-left direction based on a state where the planar body 20 is attached inside the seat frame 4F. Further, based on the state, the rear edge 20b is an edge forming a rear end of the planar body 20 and extending in the right-left direction, the right edge 20c is an edge forming a right end of the planar body 20 and extending in the front-rear direction, and the left edge 20d is an edge forming a left end of the planar body 20 and extending in the front-rear direction.

Insertion Portion

With reference to FIG. 3, a pair of insertion portions (a first insertion portion 21, a second insertion portion 22) are tubular parts through which corresponding holding bodies 11 to 14 can be passed. The insertion portions 21, 22 are made of a hollow weave fabric, which is one type of a double weave fabric. The first insertion portion 21 is a part through which the first holding body 11 and the second holding body 12 can be passed, and is provided near the front edge 20a of the planar body 20 so as to extend in the right-left direction. A first opening 21a opened forward is provided in a generally center of the first insertion portion 21 in the seat-width direction, and corresponding parts (the latching portions 11b, 12a) of the holding bodies 11, 12 can be exposed from the first opening 21a. Further, the second insertion portion 22 is a part through which the third holding body 13 and the fourth holding body 14 can be passed, and is provided near the rear edge 20b of the planar body 20 so as to extend in the right-left direction. A second opening 22a opened rearward is provided in a generally center of the second insertion portion 22 in the seat-width direction, and corresponding parts (the side frame portions 13d, 14c) of the holding bodies 13, 14 can be exposed from the second opening 22a. Note that front and rear ends of each of the insertion portions 21, 22 are closed by the after-mentioned body portion 24 made of a single weave fabric, and a corresponding edge (the front edge 20a, the rear edge 20b) of a single weave fabric.

Body Portion (High-Elongation Part)

With reference to FIGS. 2 and 3, the body portion 24 is a single weave fabric part placed between the pair of insertion portions 21, 22, and can substantially support the seat pad 4P from a lower side. With reference to FIG. 3, the body portion 24 is provided with a pair of right and left high-elongation parts 41, 42, and other planar-body parts (a plurality of low-elongation parts 51 to 55). These elongation parts are constituted by respective density regions made of constituent yarns 31, 32 described below (in FIG. 3, for convenience, the high-elongation parts are indicated by a broken-line hatch, and respective low-elongation parts are indicated by different chain-double-dashes-line hatch). The pair of right and left high-elongation parts 41, 42 are parts having a generally rectangular shape in a top view and configured to be most easily extensible in the planar body 20. The high-elongation parts 41, 42 are provided on a right side and a left side with a given distance on a front side of a rear part of the planar body 20 and are placed at respective positions at which they can support the seat-pad portions A1, A2 for supporting the occupant buttocks (particularly, the occupant hipbones). Here, the rear part of the planar body 20 is a rear-side part including respective parts opposed to the seat-pad portions A1, A2 for supporting the occupant buttocks (particularly, the occupant hipbones) when the planar body 20 is divided into two in the front-rear direction. Further, a front part of the planar body 20 is a front-side part except the rear part of planar body 20 when the planar body 20 is divided into two in the front-rear direction.

Other Planar-Body Parts (Low-Elongation Parts)

Further, with reference to FIG. 3, the plurality of low-elongation parts (a front low-elongation part 51, a rear low-elongation part 52, a right low-elongation part 53, a left low-elongation part 54, a central low-elongation part 55) is parts exemplifying other planar-body parts of the present disclosure, and is less easily extensible than the high-elongation parts 41, 42. The front low-elongation part 51 and the rear low-elongation part 52 are provided separately on the front side of the body portion 24 and on the rear side thereof across the high-elongation parts 41, 42. The front low-elongation part 51 is a part having a generally rectangular shape and constituting the front part of the body portion 24, and is placed on the front side relative to the high-elongation part 41, 42 so as to cross the body portion 24 in the right-left direction. Further, the rear low-elongation part 52 is a part having a generally rectangular shape and constituting a rear side of the rear part of the body portion 24, and is placed on the rear side relative to the high-elongation part 41, 42 so as to cross the body portion 24 in the right-left direction. Note that a width dimension of the front low-elongation part 51 in the front-rear direction is set to be larger than the rear low-elongation part 52, so that the high-elongation parts 41, 42 can be placed in a part closer to the rear side relative to a generally center of the body portion 24.

With reference to FIG. 3, the right low-elongation part 53, the left low-elongation part 54, and the central low-elongation part 55 are parts formed between the front low-elongation part 51 and the rear low-elongation part 52 in a seat front-rear direction. The right low-elongation part 53 is a part having a generally rectangular shape and formed in a right edge of the body portion 24, and is placed on the right side of the right high-elongation part 41 so as to extend in the front-rear direction. Further, the left low-elongation part 54 is a part having a generally rectangular shape and formed in a left edge of the body portion 24, and is placed on the left side of the left high-elongation part 42 so as to extend in the front-rear direction. The central low-elongation part 55 is a part having a generally rectangular shape and constituting a generally center of the planar body 20 in the seat-width direction, and is placed between the right and left high-elongation parts 41, 42 so as to extend in the front-rear direction.

Forming Operation of Body Portion

Figure 4:
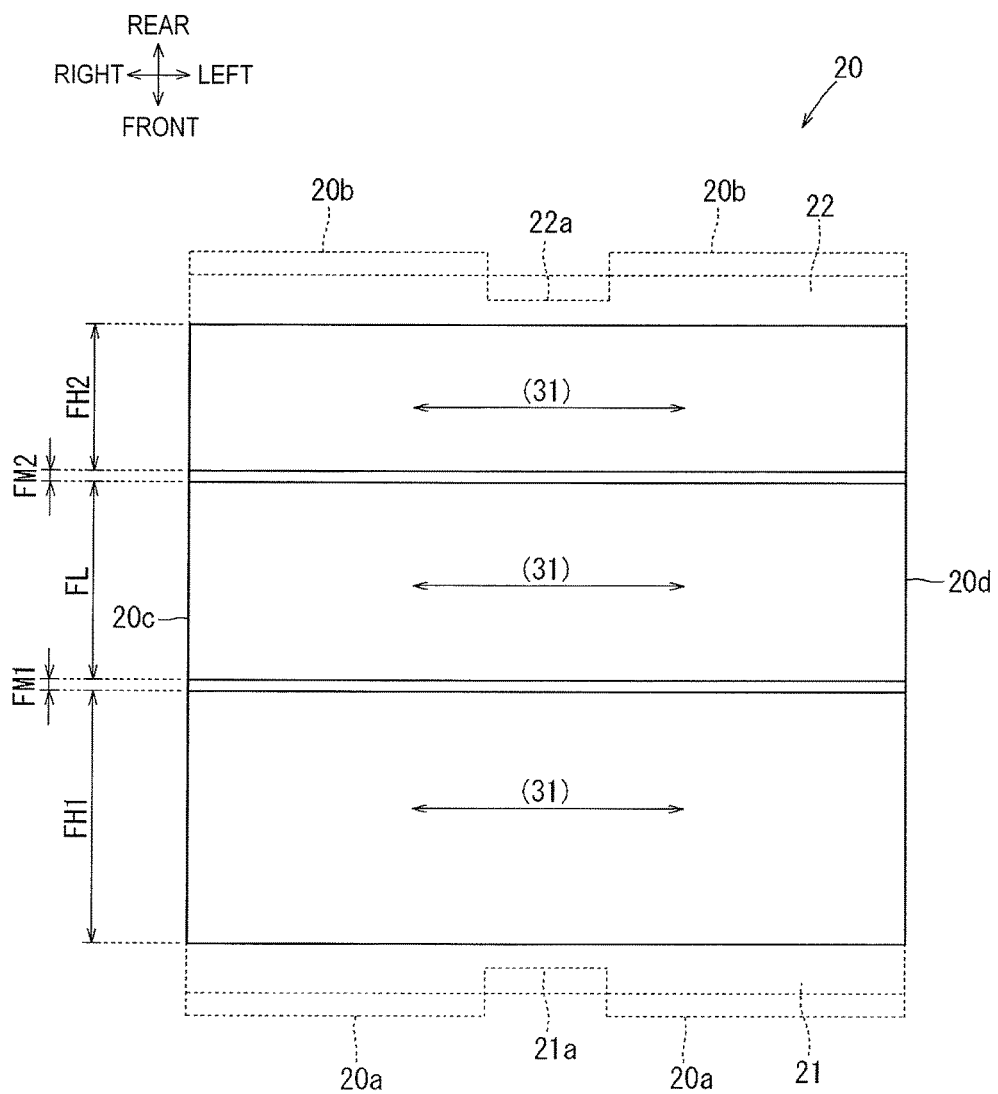
FIG. 4 is a top view of the planar body, illustrating only first constituent yarns.

With reference to FIGS. 3 to 5, at the time of weaving of the body portion 24, a plurality of first constituent yarns 31 and a plurality of second constituent yarns 32 (described later) are entangled in a crossing manner appropriately so as to form a fabric (in each figure, for convenience, arrows indicate not the constituent yarns 31, 32, but orientations of the constituent yarns 31, 32). The weaving of the body portion 24 is performed such that, after the first constituent yarns 31 are warped as warps, the second constituent yarns 32 as wefts are shot, as will be explained below. At this time, the first constituent yarns 31 are provided with coarse and fine distances therebetween, so as to form respective regions (FL, FH1, FH2, FM1, FM2) illustrated in FIG. 4 (described later). Further, the second constituent yarns 32 are provided with coarse and fine distances therebetween, so as to form respective regions (SL1, SL2, SH1 to SH3, SM1 to SM4) illustrated in FIG. 5 (described later). Further, as a weave texture of the body portion 24 and the like, a basic texture (plain weave, twill weave, satin weave) and its derivative weave can be exemplified. In the present embodiment, on the basis of a state where the planar body 20 is placed inside the seat frame 4F, the first constituent yarns 31 are placed in the right-left direction along the reinforcing frame 4c. Further, the second constituent yarns 32 are placed in the front-rear direction so as to intersect with (in the present embodiment, generally perpendicularly to) the first constituent yarns 31. Note that the above insertion portions 21, 22 are also formed sequentially along with the weaving of the body portion 24.

Formation of Respective Regions by First Constituent Yarns (Primary Low-Density Region, Primary High-Density Region)

At the time of warping of the first constituent yarns 31, a distance between the first constituent yarns 31 adjacent to each other is adjusted so as to form respective regions (a pair of front and rear primary high-density regions FH1, FH2, a primary low-density region FL, a pair of front and rear primary medium-density regions FM1, FM2) illustrated in FIG. 4. The pair of front and rear primary high-density regions FH1, FH2 are regions where the first constituent yarns 31 are placed most thickly, and are parts having a smallest elongation when the body portion 24 is viewed only in terms of the first constituent yarns 31 (the number of first constituent yarns 31 to be placed will be described later). The front primary high-density region FH1 is a generally rectangular region formed in the front part of the body portion 24, and is placed at generally the same position as the front low-elongation part 51 in FIG. 3 so as to cross the body portion 24 in the right-left direction. Further, the rear primary high-density region FH2 is a generally rectangular region formed on the rear side of the rear part of the body portion 24, and is placed at generally the same position as the rear low-elongation part 52 in FIG. 3 so as to cross the body portion 24 in the right-left direction. Further, the primary low-density region FL is a region where the first constituent yarns 31 are placed most thinly, and is placed between the pair of primary high-density regions FH1, FH2 (the number of first constituent yarns 31 to be placed will be described later). The primary low-density region FL is formed to cross the body portion 24 in the right-left direction and is placed to cross the high-elongation parts 41, 42 and the low-elongation parts 53 to 55 adjacent thereto in FIG. 3.

Here, the primary high-density regions FH1, FH2 and the primary low-density region FL illustrated in FIG. 4 have different arrangement relationships of the first constituent yarns 31 (a difference in coarseness and minuteness), so as to have different elongations. In consideration of a fineness of the first constituent yarns 31, in each of the primary high-density regions FH1, FH2, the first constituent yarns 31 can be warped with not more than 200 yarns/inch, independently. For example, in a case where the fineness of the first constituent yarns 31 is 167 T (dtex), the first constituent yarns 31 can be warped in a range of 75 yarns/inch to 45 yarns/inch independently in each of the primary high-density regions FH1, FH2, and in consideration of strength of the body portion 24, it is preferable to warp the first constituent yarns 31 in a range of 65 yarns/inch to 55 yarns/inch. Further, in the primary low-density region FL, the number of first constituent yarns 31 to be warped is reduced as compared to the primary high-density regions FH1, FH2. In the primary low-density region FL, the first constituent yarns 31 can be warped in a range of 25 yarns/inch to 55 yarns/inch, for example, and in order that the high-elongation parts 41, 42 in FIG. 3 have an appropriate elongation rate, it is preferable to warp the first constituent yarns 31 in a range of 35 yarns/inch to 45 yarns/inch. Note that, in any of the regions, more first constituent yarns 31 can be warped as the fineness of the first constituent yarns 31 becomes smaller.

Primary Medium-Density Region

Further, the pair of front and rear primary medium-density regions FM1, FM2 are regions where the first constituent yarns 31 are placed more thickly than the primary low-density region FL, but more thinly than their corresponding primary high-density regions with reference to FIG. 4 (the number of first constituent yarns 31 to be placed will be described later). The front primary medium-density region FM1 is placed between the front primary high-density region FH1 and the primary low-density region FL, and the rear primary medium-density region FM2 is placed between the rear primary high-density region FH2 and the primary low-density region FL. When the primary medium-density regions FM1, FM2 are provided, a marked difference in elongation rate between the primary low-density region FL and the primary high-density regions FH1, FH2 can be avoided as much as possible, in comparison with a case where the primary low-density region FL is adjacent to the primary high-density regions FH1, FH2. Note that respective widths of the primary medium-density regions FM1, FM2 in the front-rear direction are not particularly limited, but are typically set to sizes smaller than their corresponding primary high-density regions and the primary low-density region FL.

Further, in each of the primary medium-density regions FM1, FM2 of the present embodiment, the first constituent yarns 31 are placed to be gradually thinner (placed in a gradation manner) from its corresponding primary high-density region toward the primary low-density region FL. For example, in a case where the fineness of the first constituent yarns 31 is 167 T (dtex), it is assumed that the first constituent yarns 31 are warped by 60 yarns/inch in the front primary high-density region FH1, and the first constituent yarns 31 are warped by 40 yarns/inch in the primary low-density region FL. Under this condition, in the front primary medium-density region FM1, the first constituent yarns 31 can be warped so as to be gradually reduced toward the primary low-density region FL within a range of 59 yarns/inch to 41 yarns/inch. At this time, the first constituent yarns 31 can be reduced continuously or step by step within the range of 59 yarns/inch to 41 yarns/inch. When the first constituent yarns 31 are placed appropriately in each of the primary medium-density regions FM1, FM2 so as to be changed in density gradually as such, a marked difference in elongation rate between the front primary high-density region FH1 and the primary low-density region FL can be more surely avoided. Note that, also in the rear primary medium-density region FM2, the first constituent yarns 31 can be warped so as to be gradually reduced toward the primary low-density region FL under the same condition as the front primary medium-density region FM1.

Formation of Respective Regions by Second Constituent Yarns (Secondary High-Density Regions)

Further, at the time of shooting of the second constituent yarns 32, a distance between the second constituent yarns 32 adjacent to each other is adjusted, so that regions (a set of three secondary high-density regions SH1 to SH3, a pair of right and left secondary low-density regions SL1, SL2, and a plurality of secondary medium-density regions SM1 to SM4) illustrated in FIG. 5 can be formed. The secondary high-density regions (a right secondary high-density region SH1, a left secondary high-density region SH2, and a central secondary high-density region SH3) are regions where the second constituent yarns 32 are placed most thickly, and are parts having a smallest elongation when the body portion 24 is viewed only in terms of the second constituent yarns 32 (the number of second constituent yarns 32 to be placed will be described later). The right secondary high-density region SH1 is a generally rectangular region formed in a right edge of the body portion 24, and is placed at a position where it can cover the right low-elongation part 53 in FIG. 3 so as to cross the body portion 24 in the front-rear direction. Further, the left secondary high-density region SH2 is a generally rectangular region formed in a left edge of the body portion 24, and is placed at a position where it can cover the left low-elongation part 54 in FIG. 3 so as to cross the body portion 24 in the front-rear direction. Further, the central secondary high-density region SH3 is a generally rectangular region formed between the right and left secondary low-density regions SL1, SL2 (described later), and is placed at a position where it can cover the central low-elongation part 55 in FIG. 3 so as to cross the body portion 24 in the front-rear direction.

Secondary Low-Density Regions

Further, with reference to FIG. 5, the pair of right and left secondary low-density regions SL1, SL2 are regions where the second constituent yarns 32 are placed most thinly, and are formed on the right side and the left side of the body portion 24 in a divided manner (the number of second constituent yarns 32 to be placed will be described later). The right secondary low-density region SL1 is a generally rectangular region formed between the right secondary high-density region SH1 and the central secondary high-density region SH3, and is placed at a position where it can cover the right high-elongation part 41 in FIG. 3 so as to cross the body portion 24 in the front-rear direction. Further, the left secondary low-density region SL2 is a generally rectangular region formed between the left secondary high-density region SH2 and the central secondary high-density region SH3, and is placed at a position where it can cover the left high-elongation part 42 in FIG. 3 so as to cross the body portion 24 in the front-rear direction.

Here, the secondary high-density regions SH1 to SH3 and the secondary low-density regions SL1, SL2 also have different arrangement relationships of the second constituent yarns 32 (a difference in coarseness and minuteness), so as to have different elongations. In consideration of a fineness of the second constituent yarns 32, in each of the secondary high-density regions SH1 to SH3, the second constituent yarns 32 can be shot by not more than 200 yarns/inch, independently. For example, in a case where the fineness of the second constituent yarns 32 is 167 T (dtex), the second constituent yarns 32 can be shot in a range of 55 yarns/inch to 35 yarns/inch independently in each of the secondary high-density regions SH1 to SH3, and in consideration of the strength of the body portion 24, it is preferable to shoot the second constituent yarns 32 in a range of 50 yarns/inch to 40 yarns/inch. Further, in the secondary low-density regions SL1, SL2, the number of second constituent yarns 32 to be shot is reduced as compared to the secondary high-density regions SH1 to SH3. In each of the secondary low-density regions SL1, SL2, the second constituent yarns 32 can be shot in a range of 45 yarns/inch to 25 yarns/inch independently, and in order that the high-elongation part has an appropriate elongation rate, it is preferable to shoot the second constituent yarns 32 in a range of 40 yarns/inch to 30 yarns/inch. Note that, in any of the regions, more second constituent yarns 32 can be shot as the fineness of the second constituent yarns 32 becomes smaller.

Secondary Medium-Density Region

Further, the plurality of secondary medium-density regions (a first secondary medium-density region SM1 to a fourth secondary medium-density region SM4) are regions where the second constituent yarns 32 are placed more thickly than their corresponding secondary low-density regions, but more thinly than their corresponding secondary high-density regions with reference to FIG. 5 (the number of second constituent yarns 32 to be placed will be described later). In the present embodiment, the first secondary medium-density region SM1 is provided between the right secondary high-density region SH1 and the right secondary low-density region SL1, and the second secondary medium-density region SM2 is provided between the right secondary low-density region SL1 and the central secondary high-density region SH3. Further, the third secondary medium-density region SM3 is provided between the central secondary high-density region SH3 and the left secondary low-density region SL2, and the fourth secondary medium-density region SM4 is provided between the left secondary low-density region SL2 and the left secondary high-density region SH2. When the secondary medium-density regions SM1 to SM4 are provided, a marked difference in elongation rate between each of the secondary low-density regions SL1, SL2 and its corresponding secondary high-density region can be avoided as much as possible, in comparison with a case where the each of the secondary low-density regions SL1, SL2 is adjacent to the corresponding secondary high-density region. Note that respective widths of the secondary medium-density regions SM1 to SM4 in the front-rear direction are not particularly limited, but are typically set to sizes smaller than their corresponding secondary high-density regions and secondary low-density regions.

Further, in each of the secondary medium-density regions SM1 to SM4 of the present embodiment, the second constituent yarns 32 are placed to be gradually thinner (placed in a gradation manner) from its corresponding secondary high-density region toward its corresponding secondary low-density region. For example, in a case where the fineness of the second constituent yarns 32 is 167 T (dtex), the second constituent yarns 32 are shot by 44 yarns/inch in the right secondary high-density region SH1, and the second constituent yarns 32 are shot by 37 yarns/inch in the right secondary low-density region SL1. Under this condition, in the first secondary medium-density region SM1, the second constituent yarns 32 can be shot so as to be gradually reduced toward the right secondary low-density region SL1 within a range of 43 yarns/inch to 38 yarns/inch. At this time, the second constituent yarns 32 can be reduced continuously or step by step within a range of 44 yarns/inch to 38 yarns/inch. When the second constituent yarns 32 are placed appropriately in each of the secondary medium-density regions SM1 to SM4 so as to be changed in density gradually as such, a marked difference in elongation rate between the right secondary low-density region SL1 and the secondary high-density region SH1 can be more surely avoided. Note that, also in each of the other secondary medium-density regions SM2 to SM4, the second constituent yarns 32 can be shot so as to be gradually reduced toward its corresponding secondary low-density region under the same condition as the first secondary medium-density region SM1.

Constituent Yarns

Here, as the constituent yarns 31, 32, natural fiber derived from animal or plant, synthetic fiber, or yarns (ordinary yarns) of mixed spinning fiber thereof can be used appropriately. As the synthetic fiber, polyester fiber, polyamide fiber, polyvinylalcohol fiber, cellulosic fiber, or filaments of mixed spinning fiber thereof can be exemplified. Especially, filaments of polyester fiber (polyethylene terephthalate (PET), polytrimethylene terephthalate (PTT), polybutylene terephthalate (PBT), polylactic acid, and the like), and filaments of polyamide fiber (nylon 6, nylon 66, and the like) can be preferably used as the ordinary yarns because they are excellent in durability at the time of use. A fineness (thickness) of the ordinary yarns is not particularly limited, but can be set to, for example, around 30 dtex to 3000 dtex. Further, as the constituent yarns 31, 32, high-strength yarns excellent in strength as compared to the ordinary yarns can be used. As this type of high-strength yarns, yarns excellent in tensile strength can be exemplified, and for example, yarns made of para-aramid fiber, polyparaphenylene benzobis oxazole (PBO) fiber, polyarylate fiber, and polyethylene fiber can be used. A fineness of the high-strength yarns is also not particularly limited, but can be typically set to around 30 T (dtex) to 3000 T (dtex).

Difference in Constituent Yarns Between Respective Regions

The ordinary yarns can be used as the constituent yarns 31, 32 in all the regions, but different types of the constituent yarns 31, 32 can be used for the high-density region (and the medium-density region) and for the low-density region. For example, by using the high-strength yarns only for the constituent yarns 31, 32 in the low-density region, even if the constituent yarns 31, 32 are placed thinly, a decrease in strength of the low-density region can be avoided more surely. Further, from the viewpoint of giving an appropriate elongation to the low-density region, at least either the first constituent yarns 31 or the second constituent yarns 32 placed in the low-density region can have a relatively low fineness. When the fineness of the constituent yarns 31, 32 in the low-density region is made lower than the constituent yarns 31, 32 in the high-density region as such, a desired elongation can be more surely given to the low-density region. Here, the fineness of the constituent yarns 31, 32 in the low-density region can be set depending on an elongation to be given to the low-density region, and can be set to a fineness in a range of ¼ to ¾ (preferably generally ½) of the fineness of the constituent yarns 31, 32 in the high-density region, for example. When the fineness of the constituent yarns 31, 32 in the low-density region is set to be generally a half of the fineness of the constituent yarns 31, 32 in the high-density region, a relatively high elongation can be further surely given to the low-density region.

Formation Technique of Low-Elongation Parts

With reference to FIGS. 3 to 5, when respective regions of the first constituent yarns 31 and respective regions of the second constituent yarns 32 are provided in an overlapped manner appropriately, the low-elongation parts 51 to 55 and the high-elongation parts 41, 42 can be formed in the body portion 24. At this time, in each of the low-elongation parts 51 to 55, at least one of the primary high-density regions FH1, FH2, the primary medium-density regions FM1, FM2, the secondary high-density regions SH1 to SH3, and the secondary medium-density regions SM1 to SM4 is placed, as will be explained later. When a relatively less easily extensible part among the regions is placed in each of the low-elongation parts 51 to 55 as such, the low-elongation parts 51 to 55 are configured to be less easily extensible as compared to the after-mentioned high-elongation parts 41, 42.

The front low-elongation part 51 is constituted by the front primary high-density region FH1 and the front primary medium-density region FM1, and front-side parts of respective regions of the second constituent yarns 32, the front-side parts overlapping therewith. The front primary medium-density region FM1 overlaps with the right and left secondary low-density regions SL1, SL2, so as to have a relatively high elongation on the right side and the left side of a rear part of the front low-elongation part 51. Further, the high-density regions (FH1 and SH1 to SH3) overlap with each other in a center of the front low-elongation part 51 and right and left edges thereof, so that the elongation is made lowest. Further, the rear low-elongation part 52 is constituted by the rear primary high-density region FH2 and the rear primary medium-density region FM2, and rear-side parts of respective regions of the second constituent yarns 32, the rear-side parts overlapping therewith. The rear primary medium-density region FM2 overlaps with the right and left secondary low-density regions SL1, SL2, so as to have a relatively high elongation on the right side and the left side of a front part of the rear low-elongation part 52. Further, the high-density regions (FH2 and SH1 to SH3) overlap with each other in a center of the rear low-elongation part 52 and right and left edges thereof, so that the elongation is made lowest.

Further, the right low-elongation part 53 is formed such that the primary low-density region FL overlaps with the right secondary high-density region SH1 and the first secondary medium-density region SM1. A left edge of the right low-elongation part 53 has a relatively high elongation such that the primary low-density region FL and the first secondary medium-density region SM1 overlap with each other. Further, the left low-elongation part 54 is formed such that the primary low-density region FL overlaps with the left secondary high-density region SH2 and the fourth secondary medium-density region SM4. A right edge of the left low-elongation part 54 has a relatively high elongation such that the primary low-density region FL and the fourth secondary medium-density region SM4 overlap with each other. Further, the central low-elongation part 55 is formed such that the primary low-density region FL overlaps with the central secondary high-density region SH3, the second secondary medium-density region SM2, and the third secondary medium-density region SM3. Right and left edges of the central low-elongation part 55 have a relatively high elongation such that the primary low-density region FL and the secondary medium-density regions SM2, SM3 overlap with each other.

Formation Technique of High-Elongation Parts

The right high-elongation part 41 is formed such that the primary low-density region FL and the right secondary low-density region SL1 overlap with each other. Further, the left high-elongation part 42 is formed such that the primary low-density region FL and the left secondary low-density region SL2 overlap with each other. Since the right and left high-elongation parts 41, 42 are formed such that the low-density regions (FL and SL1, FL and SL2) overlap with each other, the right and left high-elongation parts 41, 42 become relatively easily extensible parts in the body portion 24, and become most easily extensible parts in the present embodiment.

Furthermore, relatively highly extensible parts (parts where corresponding medium-density regions are placed) of adjacent low-elongation parts 51 to 55 are further placed around the high-elongation parts 41, 42. Since corresponding medium-density regions of the low-elongation parts 51 to 55 are placed adjacent to the high-elongation parts 41, 42 as such, a marked difference in elongation rate between the low-elongation parts 51 to 55 and the high-elongation parts 41, 42 can be avoided as much as possible. That is, the right side of the rear part (the front primary medium-density region FM1) of the front low-elongation part 51 is adjacent to the front side of the right high-elongation part 41, and the right side of the front part (the rear primary medium-density region FM2) of the rear low-elongation part 52 is adjacent to the rear side of the right high-elongation part 41. Further, the left edge (the first secondary medium-density region SM1) of the right low-elongation part 53 is adjacent to the right side of the right high-elongation part 41, and the right edge (the second secondary medium-density region SM2) of the central low-elongation part 55 is adjacent to the left side of the right high-elongation part 41. Further, the left side of the rear part (the front primary medium-density region FM1) of the front low-elongation part 51 is adjacent to the front side of the left high-elongation part 42, and the left side of the front part (the rear primary medium-density region FM2) of the rear low-elongation part 52 is adjacent to the rear side of the left high-elongation part 42. Further, the left edge (the third secondary medium-density region SM3) of the central low-elongation part 55 is adjacent to the right side of the left high-elongation part 42, and the right edge (the fourth secondary medium-density region SM4) of the left low-elongation part 54 is adjacent to the left side of the left high-elongation part 42.

Here, in the present embodiment, various finishing processes can be performed on the planar body 20 after weaving. As this type of finishing processes, a refinement step, a dyeing step, a heat set step, a texture adjustment step, a post processing agent application step, and a finishing set step can be exemplified. All those steps can be performed, or one or more steps can be omitted. In those steps, heat treatment (a dry heat process or a wet heat process) is often performed on the planar body 20, and heat treatment at about 90° C. to 185° C. is often performed, for example. When the constituent yarns 31, 32 are shrunk in a surface direction of the planar body 20 by performing the heat treatment, it is possible to give an appropriate extensibility to the planar body 20, to provide a thick feeling to the planar body 20, and to improve a good sewing result of the planar body 20. Particularly, the planar body 20 made of fabric can be shrunk sufficiently by heating (can have a desired set rate), so that the finished planar body 20 can be prevented as much as possible from wearing out to be loosened.

Attachment Operation of Seat Cushion

With reference to FIGS. 2 and 3, after the planar body 20 is attached to the holding bodies 11 to 14, the holding bodies 11 to 14 are attached to appropriate positions of the seat frame 4F as will be described later. In the present embodiment, the planar body 20 is a seamless fabric as described above, and includes the tubular first insertion portion 21 and the tubular second insertion portion 22. In view of this, with reference to FIG. 3, the first holding body 11 and the second holding body 12 are passed through the first insertion portion 21 of the planar body 20 so as to be placed symmetrically. This makes it possible to attach the front side of the planar body 20 to the holding bodies 11, 12 without a sewing operation. The first holding body 11 on the right side is passed through the right side of the first insertion portion 21, such that the right latching portion 11a is exposed from a right end of the first insertion portion 21 and the left latching portion 11b is exposed from the first opening 21a. Further, the second holding body 12 on the left side is passed through the left side of the first insertion portion 21, such that the right latching portion 12a is exposed from the first opening 21a and the left latching portion 12b is exposed from a left end of the first insertion portion 21.

Further, with reference to FIG. 3, the third holding body 13 and the fourth holding body 14 are passed through the second insertion portion 22 of the planar body 20 so as to be placed symmetrically. This makes it possible to attach the rear side of the planar body 20 to the holding bodies 13, 14 without a sewing operation. The front frame portion 13a of the third holding body 13 on the right side is passed through the right side of the second insertion portion 22, such that the right side frame portion 13c is exposed from a right end of the second insertion portion 22 and the left side frame portion 13d is exposed from the second opening 22a. Further, the front frame portion 14a of the fourth holding body 14 on the left side is passed through the left side of the second insertion portion 22, such that the right side frame portion 14c is exposed from the second opening 22a and the left side frame portion 14d is exposed from a left end of the second insertion portion 22. Thus, in the present embodiment, each of the holding bodies 11 to 14 is at least partially passed through a corresponding one of the insertion portions 21, 22, so that the planar body 20 is attached to the each of the holding bodies 11 to 14. Particularly, in the present embodiment, corresponding holding bodies 11 to 14 are passed through each of the insertion portions 21, 22 provided in the front part and the rear part of the planar body 20. Hereby, the planar body 20 can be attached to the holding bodies 11 to 14 with a good balance in the front-rear direction.

Subsequently, the planar body 20 is tensioned in the surface direction, so that the holding bodies 11 to 14 are attached to respective appropriate positions of the seat frame 4F. At this time, the latching portions 11a, 11b of the first holding body 11 and the latching portions 12a, 12b of the second holding body 12 are hooked to the reinforcing frame 4c from the upper side. Further, the side frame portions 13c, 13d of the third holding body 13 and the side frame portions 14c, 14d of the fourth holding body 14 are hooked to the rear frame 4d from the upper side. Since the holding bodies 11 to 14 are attached inside the seat frame 4F as such, the planar body 20 can be placed at a position at which the seat pad 4P can be supported with a moderate tension. With reference to FIG. 2, the seat pad 4P is placed on the seat frame 4F so as to be supported by the planar body 20 from the lower side, and then, the seat pad 4P is further covered with the seat cover 4S.

Behavior of Planar Body when Occupant Sits (Role of High-Elongation Parts)

With reference to FIGS. 2 and 3, at the time when the occupant sits, the occupant is elastically supported by the seat pad 4P, and a load of the seat pad 4P is received by the planar body 20 made of a fabric such that the planar body 20 extends appropriately. In the present embodiment, in consideration that the seat-pad portions A1, A2 supporting the occupant buttocks as illustrated in FIG. 2 largely sinks, the planar body 20 is provided with the high-elongation parts 41, 42 that are more easily extensible than the low-elongation parts 51 to 55 illustrated in FIG. 3. Since the high-elongation parts 41, 42 are formed such that the low-density regions (FL and SL1, FL and SL2) of the first constituent yarns 31 and the second constituent yarns 32 overlap with each other, the high-elongation parts 41, 42 are most easily extensible in the body portion 24. When the high-elongation parts 41, 42 largely extend to support the seat-pad portions A1, A2 that support the occupant buttocks as illustrated in FIG. 2, a sitting pressure to be applied to the seat-pad portions A1, A2 is dispersed, so that a more ideal distribution of the sitting pressure can be achieved. Particularly, the seat-pad portions A1, A2 that support the occupant hipbones are received by the right and left high-elongation parts 41, 42, respectively, so that a comfortable seat configuration is obtained.

Role of Medium-Density Regions

In the meantime, in the above configuration, with reference to FIG. 3, a marked difference in elongation rate occurs between the low-elongation parts 51 to 55 (the other planar-body parts) and the high-elongation parts 41, 42, which might decrease seat performance so that the occupant feels uncomfortable. In view of this, in the planar body 20 of the present embodiment, the medium-density region (FM1, FM2, SM1 to SM4) where the constituent yarns extending in the same direction are provided more thickly than the low-density regions, but more thinly than the high-density regions is provided between the low-density region and the high-density region adjacent to each other. Further, a corresponding low-density region is placed in the high-elongation part 41, 42 so that the high-elongation part 41, 42 is easily extensible, and either of a corresponding high-density region and a corresponding medium-density region is placed in the low-elongation part 51 to 55 so that the low-elongation part 51 to 55 is less easily extensible. Further, the medium-density region (FM1, FM2, SM1 to SM4) in the low-elongation part 51 to 55 is placed adjacent to the high-elongation part 41, 42, so that a marked difference in elongation rate between the low-elongation part 51 to 55 and the high-elongation part 41, 42 is avoided as much as possible.

That is, the medium-density regions (the front primary medium-density region FM1, the rear primary medium-density region FM2, the first secondary medium-density region SM1, the second secondary medium-density region SM2) of corresponding low-elongation parts 51 to 53, 55 are placed around the right high-elongation part 41. When relatively easily extensible parts of the low-elongation parts 51 to 53, 55 are placed adjacent to the right high-elongation part 41 as such, a marked difference in elongation rate between the low-elongation parts 51 to 53, 55 and the high-elongation part 41 can be avoided as much as possible. Further, similarly, the medium-density regions (the front primary medium-density region FM1, the rear primary medium-density region FM2, the third secondary medium-density region SM3, the fourth secondary medium-density region SM4) of corresponding low-elongation parts 51, 52, 54, 55 are placed around the left high-elongation part 42. When relatively easily extensible parts of the low-elongation parts 51, 52, 54, 55 are placed adjacent to the left high-elongation part 42 as such, a marked difference in elongation rate between the low-elongation parts 51, 52, 54, 55 and the left high-elongation part 42 can be avoided as much as possible. Particularly, in the medium-density region FM1, FM2, SM1 to SM4 of the present embodiment, the constituent yarns are placed so as to be gradually reduced toward a corresponding low-density region. On this account, a marked difference in elongation rate between the right and left high-elongation parts 41, 42 and their adjacent low-elongation part 51 to 55 can be further surely avoided.

Role of Other Planar-Body Parts (Low-Elongation Parts)

Further, in the present embodiment, with reference to FIG. 3, seat performance can be further improved by placing the low-elongation parts 51 to 55 at right positions in the planar body 20. For example, the front low-elongation part 51 supports a seat-pad front part on the front side relative to the seat-pad portions A1, A2 for supporting the occupant buttocks illustrated in FIG. 2, and the seat-pad front part is a part for supporting occupant legs. By firmly supporting the seat-pad front part by the front low-elongation part 51, the occupant can easily take posture at the time of driving. Further, by firmly supporting the right and left edges of the seat pad by the right low-elongation part 53 and the left low-elongation part 54, the occupant in a sitting state can be restrained as much as possible from unsteadily moving toward the right and left sides. Particularly, in the present embodiment, the right and left edges of the front low-elongation part 51 and the rear low-elongation part 52 are also relatively less easily extensible, which makes it possible to further surely restrain the occupant from unsteadily moving toward the right and left sides. The central low-elongation part 55 is placed between the right and left high-elongation parts 41, 42, so as to firmly support a seat-pad central part for supporting a part between the occupant hipbones. The central low-elongation part 55 restricts a whole body of the occupant so as not to sink excessively, and the sitting pressure to be received from the occupant hipbones can be effectively dispersed by the right and left high-elongation parts 41, 42. Particularly, in the present embodiment, central parts of the front low-elongation part 51 and the rear low-elongation part 52 are also relatively less easily extensible, which makes it possible to further surely restrict the whole body of the occupant so as not to sink excessively.

According to the present embodiment described above, by changing the arrangement relationship of the constituent yarns 31(32), the low-density region FL (SL1, SL2) relatively easily extensible is formed in the planar body 20. The low-density region FL (SL1, SL2) allows the high-elongation parts 41, 42 to be easily extensible without members such as a lamination fabric material. Particularly, when two types of low-density regions (the primary low-density region FL and the secondary low-density regions SL1, SL2) provided in the planar body 20 are placed in an overlapped manner, the high-elongation parts 41, 42 can be made more surely easily extensible. Further, when the medium-density regions FM1, FM2, SM1 to SM4 of the other planar-body parts 51 to 55 are placed adjacent to the high-elongation parts 41, 42, a marked difference in elongation rate between the other planar-body parts 51 to 55 and the high-elongation parts 41, 42 can be avoided as much as possible. At this time, in the present embodiment, the primary medium-density region FM1, FM2 is provided between the primary low-density region FL and the primary high-density region FH1, FH2, and another secondary medium-density region SM1 to SM4 is provided between the secondary low-density region SL1, SL2 and the secondary high-density region SH1 to SH3. With those two types of medium-density regions, a marked difference in elongation rate between the other planar-body parts 51 to 55 and the high-elongation parts 41, 42 can be more surely avoided.

Further, in the present embodiment, by using high-strength constituent yarns 31 (32), even if the constituent yarns 31 (32) for the low-density region FL (SL1, SL2) are placed thinly, a decrease in strength of the high-elongation parts 41, 42 can be avoided more surely. In the present embodiment, the constituent yarns in the medium-density regions FM1, FM2, SM1 to SM4 are placed appropriately so as to be changed in density gradually (changed in a gradation manner), so that a marked difference in elongation rate between the other planar-body parts 51 to 55 and the high-elongation parts 41, 42 can be further surely avoided. Hereby, according to the present embodiment, in order to improve distribution performance of the sitting pressure of the seat, the elongation rate of the planar body 20 can be partially changed with a good performance.

Modification 1 (Example of Restriction Structure)

Here, various configurations can be employed as the configuration of the body portion, in addition to the above configuration. For example, with reference to FIG. 6, a body portion 24 in the present modification is provided with a right high-elongation part 41, and in the right high-elongation part 41, a primary low-density region FL and a right secondary low-density region SL1 are placed so as to overlap with each other. In the right high-elongation part 41, first constituent yarns 31 adjacent to each other (or second constituent yarns 32 adjacent to each other) are placed thinly, so that the constituent yarns are distanced from each other so as to easily form openings. When the openings are formed excessively, there is such a concern that a design property and durability of a planar body 20 decrease.

In view of this, the right high-elongation part 41 of the present modification has a restriction structure 60 that restricts a relative movement between the first constituent yarns 31 and the second constituent yarns 32. The restriction structure 60 is constituted by a leno weave of the first constituent yarns 31. That is, in the present modification, as the first constituent yarn 31, a twisted yarn in which two ordinary yarns (or high-strength yarns) Ya, Yb are twisted is used (in FIG. 6, one of the yarns is indicated by a hatch for convenience). At the time of weaving of the right high-elongation part 41, the leno weave in which the two ordinary yarns Ya, Yb constituting the first constituent yarns 31 are twisted around the second constituent yarns 32 appropriately is formed. In the leno weave as the restriction structure 60, the two ordinary yarns Ya, Yb are placed in a twisted manner around the second constituent yarns 32, so that a relative movement between the first constituent yarns 31 and the second constituent yarns 32 is preferably restricted. On this account, a movement (to form openings) that causes the adjacent first constituent yarns 31 to be distanced from each other can be preferably prevented by the leno weave as the restriction structure 60, so that a decrease in strength of the right high-elongation part 41 can be avoided as much as possible. Further, similarly, a movement that causes the adjacent second constituent yarns 32 to be distanced from each other can be preferably prevented by the leno weave as the restriction structure 60.

Modification 2 (Another Example of Restriction Structure)

Further, a fixed portion (not shown) for adhering and fixing first constituent yarn to second constituent yarns can be used as the restriction structure. The fixed portion as the restriction structure can be formed such that welding yarns that can be solidified after being melted by heating are used as at least either the first constituent yarns or the second constituent yarns. As the welding yarn, it is desirable to use a yarn having a melting point lower than a melting point of an ordinary yarn (a high-strength yarn), and it is further preferable to use a yarn having a melting point that is lower, by 20° C. or less, than the melting point of the ordinary yarn (the high-strength yarn). For example, in a case of using an ordinary yarn made of polyethylene terephthalate, a welding yarn (for example, a welding yarn made of polyamide, polyester, polyethylene, nylon) having a melting point of not more than 240° C. can be used. Further, the welding yarn should be partially melted and solidified, and as a welding yarn of this type, a welding yarn of a fully-melted type, a mixed-fiber type, or a sheath-core type can be exemplified. The welding yarn of the mixed fiber type is a synthetic-fiber yarn in which a fiber having a relatively high melting point is mixed with a fiber (a welding part) having a relatively low melting point. Further, the welding yarn of the sheath-core-type is a synthetic-fiber yarn having a core part having a relatively high melting point and a sheath part (a welding part) having a relatively low melting point. At the time of weaving of a high-elongation part, the welding yarns are used as at least part of the first constituent yarns or the second constituent yarns. Subsequently, the welding yarns are melted and solidified by heating at a finishing step of the planar body so as to form fixed portions integrated with counterpart constituent yarns intersecting therewith. The fixed portions (restriction structures) also allow the first constituent yarns to be partially integrated with the second constituent yarns, thereby preferably making it possible to prevent the constituent yarns from having openings.

Modification 3

Further, the configuration of the present embodiment can be also applied to the seatback 6 illustrated in FIG. 1, and the seatback 6 is a member for supporting an upper body of the occupant in a sitting state. In a case where a planar body is placed in the seatback 6, high-elongation parts are provided in an upper part of the planar body (not shown) so as to be placed in an opposed manner to seat-pad portions A3, A4 for supporting occupant shoulder blades. This allows the occupant to smoothly move his/her shoulder or hand at the time of handling. Further, a low-elongation part may be provided in a lower part of the planar body so as to be placed in an opposed manner to a seat-pad portion A5 for supporting an occupant lumbar. When the seat-pad portion A5 for supporting the occupant lumbar is firmly supported by the low-elongation part, the occupant in a sitting state can be supported stably. Note that the upper part of the planar body is an upper-side part including the parts opposed to the seat-pad portions A3, A4 for supporting the occupant shoulder blades when the planar body is divided into two in the up-down direction, on the basis of an upright state of the seatback 6. Further, the lower part of the planar body is a lower-side part except the upper part of the planar body when the planar body is divided into two in the up-down direction.

The vehicle seat of the present embodiment is not limited to the above embodiment, and other various embodiments can be employed. For example, the present embodiment exemplifies a configuration (a shape, a dimension, a configuration of the insertion portions, and the like) of the planar body 20, but is not intended to limit the configuration of the planar body. For example, the planar body can take various shapes and dimensions as long as the planar body can support the seat pad placed inside the seat frame. Further, depending on a configuration of the holding bodies, the insertion portion can be provided in at least one of the front edge, the rear edge, the right edge, and the left edge. Further, a plurality of openings can be provided in the insertion portion, and the openings may be omitted. Further, the insertion portion should be a part through which the holding body can be passed, and can be formed by an appropriate technique as well as the hollow weave fabric. Further, the holding bodies can be omitted, and the planar body can be attached to the seat frame directly.

Further, the present embodiment exemplifies configurations (shapes, dimensions, formation positions, forming numbers, and the like) of the high-elongation parts 41, 42 and the low-elongation parts 51 to 55 as the other planar-body parts, but is not intended to limit the configurations of those parts. For example, a plurality of high-elongation parts or a single high-elongation part can be provided at an appropriate position(s) of the planar body depending on the configuration of the seat pad, other than the planar-body parts for supporting the seat-pad portions that support the occupant buttocks or the occupant shoulder blades (shoulders). For example, a single high-elongation part or three or more high-elongation parts can be provided to fully cover the occupant buttocks, and the like. Further, the configuration of the low-elongation part can be changed appropriately in accordance with the configuration of the high-elongation part.

Further, the present embodiment exemplifies configurations (shapes, dimensions, formation positions, forming numbers, densities of the constituent yarns, and the like) of the low-density regions FL, SL1, SL2, the high-density regions FH1, FH2, SH1 to SH3, and the medium-density regions FM1, FM2, SM1 to SM4, but is not intended to limit the configurations of those regions. For example, each region can be formed only by use of the first constituent yarns, and the second constituent yarns can be placed on an entire surface of the planar body at the same density. Reversely, each region can be formed only by use of the second constituent yarns, and the first constituent yarns can be placed on the entire surface of the planar body at the same density. Further, the medium-density region can be formed such that the constituent yarns are placed appropriately so as to be changed in density gradually, or can be also formed such that the constituent yarns are formed at the same density. Further, like the present embodiment, in a case where a plurality of low-density regions (or high-density regions or medium-density regions) is formed, the low-density regions (or the high-density regions or the medium-density regions) can have different configurations. Further, the configuration of the embodiment and the configurations of the modifications can be used in combination appropriately.

Further, the above description deals with an example in which the high-density region, the low-density region, and the medium-density region of the present embodiment have different arrangement relationships of the first constituent yarns or the second constituent yarns (a difference in coarseness and minuteness) so as to have different elongations. Differently from this, in the high-density region, the low-density region, and the medium-density region, the first constituent yarns or the second constituent yarns may be changed in sectional area, so as to form a difference in coarseness and minuteness. That is, even if the number of constituent yarns to be placed is the same in respective regions, the constituent yarns are placed thickly in a part where the constituent yarns having a relatively large sectional area are placed. On this account, in a case where the first constituent yarns or the second constituent yarns are changed in sectional area, respective arrangement relationship of the first constituent yarns or the second constituent yarns in the high-density region, the low-density region, and the medium-density region can be made generally the same or different from each other.

Further, the present embodiment exemplifies configurations (shapes, dimensions, arrangement positions, disposition numbers, and the like) of the holding bodies 11 to 14, but is not intended to limit the configurations of the holding bodies. For example, a single long holding body can be passed through each of the first insertion portion and the second insertion portion. Further, the holding body can be provided to border a peripheral edge of the planar body. In this case, a single frame-shaped holding body can be used, and a plurality of holding bodies can be used in parallel with each other. Further, as a mounting technique of the holding body to the seat frame, the following techniques can be exemplified: direct mounting techniques such as latching, locking, fitting, and fastening; and indirect mounting techniques using other members such as a spring. Further, the holding body can be attached to at least one of the front frame, the side frame, the reinforcing frame, and the rear frame, and can be also attached to another frame (omitted in the present application) forming one side in the frame. As long as the holding body has rigidity that allows the holding body to hold the planar body, the holding body can be made of various components such as a bar, a wire material, a pipe material, and a plate material. Note that the present embodiment describes an example in which the holding body is attached to a corresponding seat frame with an outer shape of the planar body being maintained (a state where the constituent yarns intersect with each other generally at right angles is maintained). Alternatively, the holding body can be attached to the corresponding seat frame such that the planar body having a generally rectangular shape is deformed into a parallelogram (placed such that the constituent yarns diagonally intersect with each other).

Further, the present embodiment exemplifies a configuration (a shape, a dimension, constituent components, and the like) of the vehicle seat 2, but is not intended to limit the configuration of the vehicle seat. Further, the configuration of the present embodiment is also applicable to various seat constituent components other than the seat cushion 4 and the seatback 6. The configuration of the present embodiment is applicable to general vehicle seats for a vehicle, an aircraft, a train, and the like.

What is claimed is:

1. A vehicle seat comprising:
a seat frame;
a seat pad; and
a planar body configured to support, from a backside, the seat pad placed inside the seat frame, the planar body being provided with a high-elongation part more easily extensible than other planar-body part, wherein:
the planar body is a fabric configured such that a plurality of constituent yarns is entangled;
the planar body includes a low-density region in which the constituent yarns extending in the same direction are placed thinly, a high-density region in which the constituent yarns extending in the same direction are placed more thickly than the low-density region, and a medium-density region in which the constituent yarns extending in the same direction are placed more thickly than the low-density region, but more thinly than the high-density region, the medium-density region being provided between the low-density region and the high-density region adjacent to each other;
the low-density region is placed in the high-elongation part so that the high-elongation part is easily extensible;
the high-density region and the medium-density region are placed in the other planar-body part so that the other planar-body part is less easily extensible; and
the medium-density region in the other planar-body part is adjacent to the high-elongation part.

2. The vehicle seat according to claim 1, wherein:
the planar body is a fabric in which a plurality of first constituent yarns extending in one direction and a plurality of second constituent yarns extending in a direction intersecting with the one direction are entangled;
the planar body includes, as the low-density region and the high-density region, a primary low-density region and a primary high-density region each constituted by the plurality of first constituent yarns, and a secondary low-density region and a secondary high-density region each constituted by the plurality of second constituent yarns;
the medium-density region is provided between the primary low-density region and the primary high-density region and between the secondary low-density region and the secondary high-density region;
the primary low-density region and the secondary low-density region are placed in an overlapped manner in the high-elongation part so that the high-elongation part is easily extensible;
at least one of the primary high-density region and the secondary high-density region, and the medium-density region are placed in the other planar-body part so that the other planar-body part is less easily extensible; and
the medium-density region in the other planar-body part is adjacent to the high-elongation part.

3. The vehicle seat according to claim 1, wherein:
the planar body is a fabric in which a plurality of first constituent yarns extending in one direction and a plurality of second constituent yarns extending in a direction intersecting with the one direction are entangled; and the high-elongation part has a restriction structure configured to restrict a relative movement between the first constituent yarns and the second constituent yarns.

4. The vehicle seat according to claim 1, wherein the constituent yarns placed in the low-density region have a higher strength than the constituent yarns placed in the high-density region.

5. The vehicle seat according to claim 1, wherein in the medium-density region, the constituent yarns extending in the same direction are placed to be gradually thinner from the high-density region toward the low-density region.

6. The vehicle seat according to claim 1, wherein:

the vehicle seat includes a seat cushion configured to support a lower part of a body of an occupant in a sitting state, and a seatback provided in a raised state from a rear part of the seat cushion so as to support an upper body of the occupant in the sitting state;

at least one member out of the seat cushion and the seatback includes the seat frame, the seat pad, and the planar body;

in a case where the one member is the seat cushion, the high-elongation part is provided in a rear part of the planar body, the rear part being configured to support a seat-pad portion that supports hipbones of the occupant in the sitting state; and in a case where the one member is the seatback, the high-elongation part is provided in an upper part of the planar body in the raised state, the upper part being configured to support a seat-pad portion that supports shoulder blades of the occupant in the sitting state.

* * * * *